(12) United States Patent
Monro

(10) Patent No.: US 8,055,074 B2
(45) Date of Patent: *Nov. 8, 2011

(54) SHAPE REPRESENTATION USING FOURIER TRANSFORMS

(76) Inventor: Donald Martin Monro, Beckington (GB)

(*) Notice: Subject to any disclaimer, the term of this patent is extended or adjusted under 35 U.S.C. 154(b) by 964 days.

This patent is subject to a terminal disclaimer.

(21) Appl. No.: 11/654,496

(22) Filed: Jan. 17, 2007

(65) Prior Publication Data

US 2008/0170760 A1      Jul. 17, 2008

(51) Int. Cl.
*G06K 9/48* (2006.01)

(52) U.S. Cl. ........ 382/199; 382/115; 382/117; 382/181; 382/190; 382/195

(58) Field of Classification Search .................. 382/115, 382/117, 181, 190–208
See application file for complete search history.

(56) References Cited

U.S. PATENT DOCUMENTS

| | | | | |
|---|---|---|---|---|
| 6,144,754 A | * | 11/2000 | Okano et al. ................. | 382/117 |
| 6,714,665 B1 | * | 3/2004 | Hanna et al. ................. | 382/117 |
| 6,801,661 B1 | | 10/2004 | Sotak et al. | |
| 2006/0147094 A1 | | 7/2006 | Yoo | |

OTHER PUBLICATIONS

Ghosh, "An Algebra of Geometric Shapes", *IEEE Computer Graphics and Applications*, 1993, p. 50, U.S.
B. Bonney, et al., "Iris pattern extraction using bit planes and standard deviations", *Conference Record of the Thirty-Eighth Asilomar Conference on Signals, Systems and Computers*, 2004, U.S.
Y. Du, et al., "Analysis of Partial Iris Recognition Using a 1-D Approach", *Proceedings of the 2005 IEEE International Conference on Acoustics, Speech, and Signal Processing*, Mar. 18-23, 2005, U.S.
International Search Report for PCT/EP2008/050370 mailed Jul. 21, 2009.
Clarysse, P., "Two-dimensional Spatial and Temporal Displacement and Deformation Field Fitting from Cardiac Magnetic Resonance Tagging", *Medical Image Analysis*, 2000, pp. 253-268, XP002482596.
Lestrel, Pete E., "Introduction and Overview of Fourier Descriptors", *Fourier Descriptors and Their Applications in Biology*, 2001, pp. 22-44, XP008090742; ISBN: 978-0-521-45201-4.
Niemel, L. P. W. et al., "A Novel Description of Handwritten Characters for Use with Generalised Fourier Descriptors", *European Transactions on Telecommunications and Related Technologies*, AEI, Milano, IT, Sep. 1, 1992, pp. 455-464, XP000315364; ISSN: 1120-3862.
Sener, S. et al., "Affine Invariant Fitting of Algebraic Curves using Fourier Descriptors", *Pattern Analysis and Applications*, Springer-Verlag, vol. 8, No. 1-2, Sep. 1, 2005, pp. 72-83, XP019381480; ISSN: 1433-755X.
Unel, M. et al., "Fitting Circle Polynomials to Planar Objects", *Proc. of the First Workshop on Computer Vision, Pattern Recognition and Image Processing*; XP002482595 Oct. 23, 1998.

(Continued)

*Primary Examiner* — Vikkram Bali
*Assistant Examiner* — Daniel Zeilberger
(74) *Attorney, Agent, or Firm* — Ungaretti & Harris LLP

(57) ABSTRACT

A method of approximating the inner or outer boundary of an iris comprises generating an approximate boundary representation (20) comprising a least squares approximation by a Fourier Series of a function of the angle (θ) about a fixed point (A) of the distance of measured points (10) on the boundary from the fixed point (A). More broadly, the method may be used to approximate the shape of any two-dimensional curve or figure.

5 Claims, 1 Drawing Sheet

OTHER PUBLICATIONS

Wyatt, Harry J., "The Form of the Human Pupil", *Vision Research*; Pergamon Press, Oxford, GB, vol. 35, No. 14; XP001077732; ISSN: 0042-6989 Jul. 1, 1995, 2021-2036.

Da Fontoura Costa, Luciano, "Estimating Derivatives and Curvature of Open Curves", *Pattern Recognition*, Elsevier, GB, Nov. 1, 2002, pp. 2445-2451; XP 004819285; ISSN: 0031-3203.

Oirrak, Ahmed El, "Affine Invariant Descriptors Using Fourier Series", *Pattern Recognition Letters*, Elsevier, Amsterdam, NL, Aug. 2002, pp. 1109-1118; XP004349759; ISSN: 0167-8655.

Vanicek, Petr; "Further Development and Properties of the Spectral Analysis by Least-Squares"; Dec. 7, 1970; Astrophysics and Space Science, vol. 12, 1971; pp. 10-33.

* cited by examiner

SHAPE REPRESENTATION USING FOURIER TRANSFORMS

CROSS-REFERENCE TO RELATED APPLICATIONS

None.

TECHNICAL FIELD

The present invention relates to shape representation using Fourier Transforms. The invention finds particular although not exclusive application in biometrics, for example, in the generation of approximate representations of the outer and/or inner boundary of the iris in the human eye.

BACKGROUND

Ghosh and Jain ("An Algebra of Geometric Shapes", *IEEE Computer Graphics and Applications*, 1993, 50) describe the use of Fast Fourier Transforms (FFTs) to model the outline of a shape by tracking around its outer periphery.

It is of considerable importance in biometric systems that rely on iris recognition to be able to identify and map accurately both the outer edge of the iris and also the inner edge (the periphery of the pupil). Many iris recognition systems assume that the shape of the pupil is always circular, an assumption which may be inaccurate in many cases. Indeed, even when pupils are circular, they tend to become elongate or oblong when viewed from an angle.

Some research into non-circular pupil localisation has been carried out: See B. Bonney, R. Ives, D. Etter, and D. Yingzi, "Iris pattern extraction using bit planes and standard deviations," *Conference Record of the Thirty-Eighth Asilomar Conference on Signals, Systems and Computers*, 2004, Y. Du, B. L. Bonney, R. W. Ives, D. M. Etter, and R. Schultz, "Analysis of Partial Iris Recognition Using a 1-D Approach," *Proceedings of the* 2005 *IEEE International Conference on Acoustics, Speech, and Signal Processing*, Mar. 18-23, 2005. However, in spite of these earlier approaches, there still remains a need for a system which can in a straightforward way approximate a boundary given a number of points (which may not be equally spaced) on that boundary.

SUMMARY OF THE INVENTION

According to a first aspect of the present invention there is provided a method of approximating an iris boundary, comprising the steps of:

acquiring an image of an eye, including an iris boundary;
noting a plurality of spaced boundary points on the boundary;
selecting a fixed reference point; and,
generating an approximate boundary representation comprising a least squares approximation by a Fourier Series as a function of angle about said fixed point of the distance of said boundary points from said fixed point.

Because the points on the boundary may not be equally spaced, the standard method of calculating the Fourier Series coefficients such as the Discrete Fourier Transform (DFT) or the Fast Fourier Transform (FFT) cannot be used.

Preferably, this method is used to map the inner boundary of the iris (or, equivalently, the outer boundary of the pupil) of a human eye. Alternatively, it may be used to map the outer iris boundary.

In the method described, the use of higher harmonics provides excellent pupil localisation, both on general and on non-ideal eye images. The method provides excellent results on the vast majority of pupils which are significantly non-circular.

According to a second aspect of the present invention there is provided a method of approximating a two-dimensional shape, comprising the steps of:

noting a plurality of spaced measured points on the shape;
selecting a fixed reference point; and,
generating an approximate shape representation comprising a least squares approximation by a Fourier Series as a function of angle about said fixed point of the distance of said measured points from said fixed point.

BRIEF DESCRIPTION OF DRAWINGS

The invention may be carried into practice in a number of ways and one specific embodiment will now be described, by way of example, with reference to the accompanying drawings, in which.

DETAILED DESCRIPTION

Figure 1:
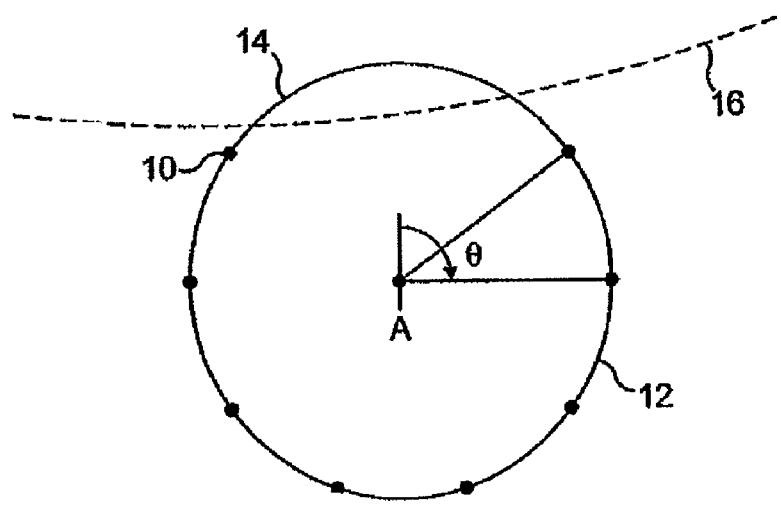
FIG. 1, shows a non-circular pupil shape, as imaged; and,
FIG. 2, shows an approximation to that shape.

The way in which an embodiment of the invention may be applied to a particular problem, that of characterising a non-circular pupil shape, will now be described.

First, an eye may be imaged, and the image analysed to identify a plurality of points 10, which occur on the imaged pupil/iris boundary 12. To do this, an approximate pupil location may be first determined by searching for a dark area of significant size close to the image centre. A histogram analysis may then be carried out to find a more exact centre as well as the average pupil radius. This approximate circular pupil boundary may then be examined in detail to obtain the required number of edge points 10. In the preferred embodiment 16 such points are identified. It will be understood by those skilled in the art that other methods may be employed to locate points on the pupil/iris boundary and the scope of the claimed subject matter is not limited in this respect.

It will also be understood that the points 10 may not necessarily be equally spaced around the edge of the pupil. Indeed, in some images part of the boundary 14 may be obscured by an eyelid and/or eyelashes 16.

Figure 2:
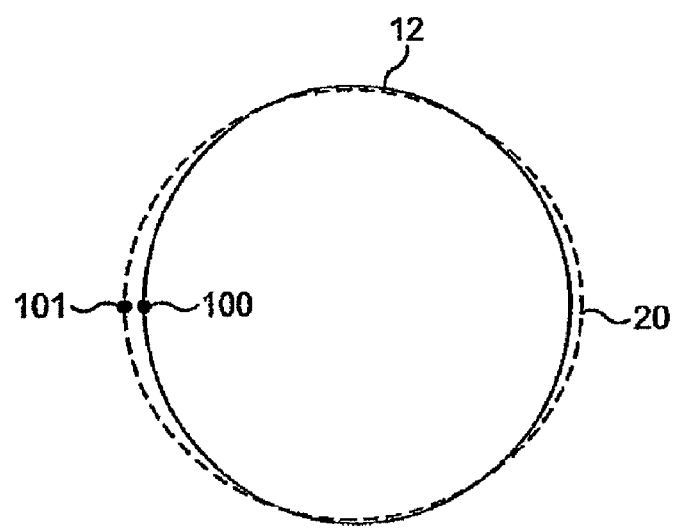

Once the boundary points 10 have been identified, those points can be used to generate a mathematical approximation 20 of the actual curve 12, as is shown in FIG. 2. In the present invention, the fitted curve 20 is a Fourier Series least squares approximation, as a function of angle $\theta$, of the distance of the points 10 from a notional fixed point A (see FIG. 1).

We wish to describe the distance $d(\theta)$ of a curve in the plane from a known or assumed centre A as a harmonic function of the angle $\theta$ in the form of a 1D Fourier Series. For simplicity, we will assure the function $d(\theta)$ to be single valued in $\theta$.

$$d(\theta) = \sum_{n=0}^{N} a_n \cos(n\theta) + b_n \sin(n\theta)$$

A standard discrete Fourier Series such as a FFT is a least squares fit of regularly spaced data, and because of the orthogonality of the functions cos and sin results in a standard formula by which $a_n$ and $b_n$ may be calculated. However, such an approach cannot generally be used here, as the points we need to fit $\{r_i,\theta_i; i=1 \wedge M\}$ may be irregular in $\theta_i$.

If the error in the fit is:

$$E(\theta_i)=d(\theta_i)-r_i$$

Then we wish to find $\{a_n,b_n;n=0\ldots N\}$ which minimizes the sum of squares of the error, $$E^2 = \sum_{i=1}^{M} E(\theta_i)^2$$
$$= \sum_{i=1}^{M} (d(\theta_i) - r_i)^2$$
$$= \sum_{i=1}^{M} \left[\left\{\sum_{n=0}^{N} a_n\cos n\theta_i + b_n\sin n\theta_i\right\} - r_i\right]^2$$

To do this we differentiate with respect to $a_k$ and $b_k$ and equate to zero in the usual way:

$$\frac{\partial E^2}{\partial a_k} = \sum_{i=1}^{M} 2\left[\sum_{n=0}^{N} a_n\cos n\theta_i + b_n\sin n\theta_i - r_i\right]\cos k\theta_i = 0$$

$$\frac{\partial E^2}{\partial b_k} = \sum_{i=1}^{M} 2\left[\sum_{n=0}^{N} a_n\cos n\theta_i + b_n\sin n\theta_i - r_i\right]\sin k\theta_i = 0$$

Noting that $b_0=0$, this can be expressed as the system of linear equations $$PV=C$$

where the unknowns are V;

$$V = \begin{bmatrix} a_0 \\ a_1 \\ \vdots \\ a_N \\ b_1 \\ \vdots \\ b_N \end{bmatrix} \text{ and the right hand side is } C = \begin{bmatrix} C_0 \\ C_1 \\ \vdots \\ C_N \\ C_{N+1} \\ \vdots \\ C_{2N} \end{bmatrix}$$

with $$C_0 = \sum_{i=0}^{M} r_i, \quad C_k = \sum_{i=0}^{M} r_i\cos k\theta_i \text{ and}$$

$$C_{N+k} = \sum_{i=0}^{M} r_i\sin k\theta_i$$

for $k=1\ldots N$

The 2N+1 by 2N+1 matrix P is $$P_{k,n} =$$
$$\sum_{i=1}^{M} \cos n\theta_i\cos k\theta_i \text{ for } k = 0\ldots N \text{ and } n = 0\ldots N \text{ (Upper Left Matrix)}$$

$$P_{k,N+n} =$$
$$\sum_{i=1}^{M} \sin n\theta_i\cos k\theta_i \text{ for } k = 0\ldots N \text{ and } n = 1\ldots N \text{ (Upper Right Matrix)}$$

$$P_{N+k,n} =$$
$$\sum_{i=1}^{M} \cos n\theta_i\sin k\theta_i \text{ for } k = 1\ldots N \text{ and } n = 0\ldots N \text{ (Lower Left Matrix)}$$

$$P_{N+k,N+n} =$$
$$\sum_{i=1}^{M} \sin n\theta_i\sin k\theta_i \text{ for } k = 1\ldots N \text{ and } n = 1\ldots N \text{ (Lower Right Matrix)}$$

The matrix is symmetric. This can be solved for any M and N giving an approximation by N harmonics to M given points. Many standard methods are known for solving such a system of equations and the scope of the claimed subject matter is not limited in this respect.

In the case where M=N and the points are equally spaced in $\theta_i=0, 2\pi/N+1, \ldots 2N\pi/N+1$, the matrix P is diagonal and the solution is exactly the Discrete Fourier Transform.

Where $M \geq N$, the equations above minimise the Root Mean Square (RMS) error between each measured point 100 on the actual boundary, and the closest corresponding point 101 of the fitted boundary 20. When the number of coefficients is 1, the fitted curve is a circle, and as the number of coefficients increases the RMS error generally decreases. It has been found in practice that good results in iris approximation can be obtained by using 5 coefficients.

In addition to modelling the boundary of the pupil (or, equivalently, the inner boundary of the iris), the present embodiment may also be used to model the shape of the outer boundary of the iris. Once the inner and outer boundaries have been determined, biometric identification can proceed in the normal way based on the characteristics of the iris image between the inner and outer boundaries.

The position of the fixed point A (FIG. 1) is not of great importance, and although the approximate centre of the pupil is a convenient point to take other points are not excluded—even points which lie outside the boundary being fitted. Of course, if the fixed point lies outside the boundary, the resulting function will no longer be single valued in $\theta$, and a corresponding allowance for that will need to be made.

If there is a large variability in distances, an improved fit may sometimes be achieved using a multi-pass approach: carry out a first fit, exclude any outliers which are greater than a cut-off value, and repeat the calculation. The cut-off value may be fixed, or may be data dependent, for example a given number of standard deviations.

It will be understood that the method described above may find application in the fitting of a variety of other curves and/or boundaries, in addition to fitting of the inner and outer iris boundaries. With a suitable choice of fixed reference points, the method could even be used to approximate open shapes such as simple curve fragments.

I claim:

1. A method of approximating an iris boundary, comprising the steps of:
    acquiring an image of an eye, including an iris boundary;
    noting a plurality of unequally spaced boundary points on the boundary;
    selecting a fixed reference point;
    generating an approximate boundary representation comprising a least squares approximation by a Fourier Series as a function of angle $\theta_i$ about said fixed point of the distance of said boundary points in the image from said fixed point; and the spaced boundary points being not all equally spaced in $\theta_i$, and in which said least-squares approximation minimizes the sum of squares of errors in the distances taken over the boundary points, the approximate boundary representation being generated by numerically solving the system of linear equations

PV=C or a mathematical equivalent thereof, for the unknown matrix V, where:

$$V = \begin{bmatrix} a_0 \\ a_1 \\ \vdots \\ a_N \\ b_1 \\ \vdots \\ b_N \end{bmatrix} \quad C = \begin{bmatrix} C_0 \\ C_1 \\ \vdots \\ C_N \\ C_{N+1} \\ \vdots \\ C_{2N} \end{bmatrix}$$

with $C_0 = \sum_{i=0}^{M} r_i$, $C_k = \sum_{i=0}^{M} r_i \cos k\theta_i$ and $C_{N+k} = \sum_{i=0}^{M} r_i \sin k\theta_i$ for $k = 1 \ldots N$, and where $P$ is a $2n+1$ by $2N=1$ matrix given by:

$$P_{k,n} = \sum_{i=1}^{M} \cos n\theta_i \cos k\theta_i \text{ for } k = 0 \ldots N \text{ and } n = 0 \ldots N \text{ (Upper Left Matrix)}$$

$$P_{k,N+n} = \sum_{i=1}^{M} \sin n\theta_i \cos k\theta_i \text{ for } k = 0 \ldots N \text{ and } n = 1 \ldots N \text{ (Upper Right Matrix)}$$

$$P_{N+k,n} = \sum_{i=1}^{M} \cos n\theta_i \sin k\theta_i \text{ for } k = 1 \ldots N \text{ and } n = 0 \ldots N \text{ (Lower Left Matrix)}$$

$$P_{N+k,N+n} = \sum_{i=1}^{M} \sin n\theta_i \sin k\theta_i \text{ for } k = 1 \ldots N \text{ and } n = 1 \ldots N \text{ (Lower Right Matrix)}.$$

2. A method as claimed in claim 1 in which the boundary is the pupil/iris boundary.

3. A method as claimed in claim 1 in which the boundary is the outer iris boundary.

4. A method as claimed in claim 1 in which the fixed reference point is in the approximate center of the iris boundary.

5. A method as claimed in claim 1 in which, following the generating step, any boundary points which lie more than a selected distance from the boundary representation are excluded, and the generating step is then repeated.

\* \* \* \* \*

UNITED STATES PATENT AND TRADEMARK OFFICE
CERTIFICATE OF CORRECTION

| | | |
|---|---|---|
| PATENT NO. | : 8,055,074 B2 | Page 1 of 1 |
| APPLICATION NO. | : 11/654496 | |
| DATED | : November 8, 2011 | |
| INVENTOR(S) | : Donald Martin Monro | |

It is certified that error appears in the above-identified patent and that said Letters Patent is hereby corrected as shown below:

In the Issued Patent, Column 5, line 29, in Claim 1, delete "$2n + 1$ by $2N = 1$"

and insert -- $2N + 1$ by $2N + 1$ -- therefor.

Signed and Sealed this
Third Day of January, 2012

David J. Kappos
*Director of the United States Patent and Trademark Office*